(12) United States Patent
Ibarra Castillo et al.

(10) Patent No.: US 12,296,379 B2
(45) Date of Patent: May 13, 2025

(54) PROCESS FOR PRODUCING CLEAN STEEL PRODUCTS WITH A LOW NITROGEN CONTENT USING AN ELECTRIC ARC FURNACE AND A DEGASSING SYSTEM

(71) Applicant: Ternium Mexico S.A. de C.V., San Nicolás de los Garza (MX)

(72) Inventors: Francisco Fernando Ibarra Castillo, San Nicolás de los Garza (MX); Hugo Solís Tovar, San Nicolás de los Garza (MX); Jorge Adalberto Tena Morelos, San Nicolás de los Garza (MX); Juan Manuel Beirana Mendez, San Nicolás de los Garza (MX)

(73) Assignee: Ternium Mexico S.A. de C.V., San Nicolás de los Garza (MX)

( * ) Notice: Subject to any disclaimer, the term of this patent is extended or adjusted under 35 U.S.C. 154(b) by 0 days.

(21) Appl. No.: 18/783,316

(22) Filed: Jul. 24, 2024

(65) Prior Publication Data

US 2025/0083218 A1 Mar. 13, 2025

Related U.S. Application Data

(60) Provisional application No. 63/582,078, filed on Sep. 12, 2023.

(51) Int. Cl.
*B22D 11/00* (2006.01)
*B22D 11/113* (2006.01)
(Continued)

(52) U.S. Cl.
CPC .......... *B22D 11/002* (2013.01); *B22D 11/113* (2013.01); *C21C 5/5264* (2013.01);
(Continued)

(58) Field of Classification Search
CPC ... B22D 11/002; B22D 11/113; C21C 5/5264; C21C 5/562; C21C 7/0025;
(Continued)

(56) References Cited

U.S. PATENT DOCUMENTS 7,608,129 B2 10/2009 Zendejas-Martinez
8,221,562 B2 7/2012 Valdez
(Continued)

FOREIGN PATENT DOCUMENTS

CN 105714016 A 6/2016
EP 1997916 B1 10/2016
WO WO-2022033921 A1 * 2/2022 ............ C21B 11/02

OTHER PUBLICATIONS

Lule, R., et al. "The Production of steels applying 100% DRI for nitrogen removal." Proceedings of the AISTech—Iron and Steel Technology Conference Proceedings, St. Louis, MI, USA. 2009. (Year: 2009).*

(Continued)

*Primary Examiner* — Keith D. Hendricks
*Assistant Examiner* — Moriah S. Smoot
(74) *Attorney, Agent, or Firm* — Knobbe, Martens, Olson & Bear, LLP

(57) ABSTRACT

A process for producing clean steel products with low nitrogen content, below 35 ppm, in a steelmaking plant comprising a direct reduced iron (DRI) source, which may be a direct reduction plant or a DRI storage facility, an electric arc furnace (EAF), a vacuum degassing system (DS), and a continuous casting system (CC) is disclosed. The process comprises a first stage of melting and refining a metallic iron charge, a second stage of tapping molten steel from the electric arc furnace (EAF) into a ladle, a third stage of exposing molten steel to a pressure below the atmospheric (Continued)

pressure and a fourth stage of casting molten steel to clean steel products. Optionally, the molten steel tapped from the EAF is treated in a ladle furnace (LF) prior to being treated in the degassing system (DS). The metallic iron charge fed to the EAF comprises more than 70% by weight of DRI in the form of pellets or briquettes having a carbon content above 2.5 weight %. Preferably, the metallic iron charge is fed to the EAF at a temperature of 400° C. or higher. The low nitrogen level in the steel products made according to the Application is achieved by forming a first foamy slag in said first process stage and is maintained in a foamy state by controlling the feed of fluxes, oxygen, and carbonaceous materials to the EAF and by forming a second slag, after molten steel is tapped from the EAF, having a predetermined composition capable of continuing the desulfurization and providing a thermal and chemical insulation to prevent nitrogen pickup and promote nitrogen removal of molten steel. The process also comprises carrying out one or more of the following actions: (a) controlling the concentration of nitrogen and sulfur in the raw materials at each process stage, (b) promoting nitrogen removal from steel, (c) decreasing the time spent by the molten steel at each process stage and between each and subsequent process stages, and (d) preventing nitrogen pickup by the molten steel all along said process stages. Steel products made according to the Application comprise the following elements expressed in weight %: $C \leq 0.05\%$, $Si \leq 4.5\%$, $Al \leq 2.0\%$; $Mn \leq 2.0\%$; $P \leq 0.20\%$; $Ni \leq 0.200\%$, $Cu \leq 0.200\%$; $N \leq 0.0030\%$, $Ni \leq 0.200\%$, $S \leq 0.0035\%$.

23 Claims, 4 Drawing Sheets

(51) Int. Cl.

| | |
|---|---|
| C21C 5/52 | (2006.01) |
| C21C 5/56 | (2006.01) |
| C21C 7/00 | (2006.01) |
| C22C 38/00 | (2006.01) |
| C22C 38/02 | (2006.01) |
| C22C 38/04 | (2006.01) |
| C22C 38/06 | (2006.01) |
| C22C 38/08 | (2006.01) |
| C22C 38/16 | (2006.01) |
| C22C 38/22 | (2006.01) |
| C22C 38/24 | (2006.01) |
| C22C 38/28 | (2006.01) |
| C22C 38/32 | (2006.01) |
| C22C 38/60 | (2006.01) |

(52) U.S. Cl.
CPC ............ *C21C 5/562* (2013.01); *C21C 7/0025* (2013.01); *C21C 7/0075* (2013.01); *C22C 38/001* (2013.01); *C22C 38/02* (2013.01); *C22C 38/04* (2013.01); *C22C 38/06* (2013.01); *C22C 38/08* (2013.01); *C22C 38/16* (2013.01); *C22C 38/22* (2013.01); *C22C 38/24* (2013.01); *C22C 38/28* (2013.01); *C22C 38/32* (2013.01); *C22C 38/60* (2013.01)

(58) Field of Classification Search
CPC ..... C21C 7/0075; C22C 38/001; C22C 38/02; C22C 38/04; C22C 38/06; C22C 38/08; C22C 38/16; C22C 38/22; C22C 38/24; C22C 38/28; C22C 38/32; C22C 38/60
See application file for complete search history.

(56) References Cited

U.S. PATENT DOCUMENTS

| | | | |
|---|---|---|---|
| 8,377,168 | B2 | 2/2013 | Zendejas-Martinez |
| 8,771,397 | B2 | 7/2014 | Garza-Rodriguez |
| 8,940,076 | B2 | 1/2015 | Duarte-Escareño |
| 8,961,648 | B2 | 2/2015 | Becerra-Novoa |
| 9,328,395 | B2 | 5/2016 | Martinis |
| 9,500,412 | B2 | 11/2016 | White |
| 9,546,409 | B2 | 1/2017 | Zendejas-Martinez |
| 9,725,778 | B2 | 8/2017 | Martinis |
| 9,938,595 | B2 | 4/2018 | Becerra-Novoa |
| 10,161,851 | B2 | 12/2018 | Scipolo |
| 10,927,424 | B2 | 2/2021 | Zendejas-Martinez |
| 11,255,743 | B2 | 2/2022 | Luccini |
| 11,391,515 | B2 | 7/2022 | Reali |
| 2008/0092692 | A1* | 4/2008 | Sahajwalla ........... C21C 5/5264 266/287 |

OTHER PUBLICATIONS

Pretorius, Eugene. "Fundamentals of EAF and ladle slags and ladle refining principles." Bakers Refractories (2015). (Year: 2015).*
Dutta, Sujay Kumar, and Yakshil B. Chokshi. "Chapter 7: Sponge Iron." Basic Concepts of Iron and Steel Making. Springer Nature, 2020 pp. 149-148. (Year: 2020).*
Dutta, Sujay Kumar, and Yakshil B. Chokshi. "Chapter 16: Electric Furnace Processes." Basic Concepts of Iron and Steel Making. Springer Nature, 2020 pp. 401-496. (Year: 2020).*
Foote, Bill, Anke Teeuwsen, and Peter Raynerd. "Ruhrstahl-Heraeus process with mechanical vacuum pumps: absurdity or red-hot technology and money well spent." Millennium Steel (2021): 66-71. (Year: 2021).*
International Search Report issued in International Patent Application No. PCT/US2024/039418, dated Sep. 10, 2024.

* cited by examiner

PROCESS FOR PRODUCING CLEAN STEEL PRODUCTS WITH A LOW NITROGEN CONTENT USING AN ELECTRIC ARC FURNACE AND A DEGASSING SYSTEM

INCORPORATION BY REFERENCE TO ANY PRIORITY APPLICATIONS

Any and all applications for which a foreign or domestic priority claim is identified in the Application Data Sheet or PCT Request as filed with the present application are hereby incorporated by reference under 37 CFR 1.57, and Rules 4.18 and 20.6. This application claims the benefit of U.S. Provisional Application No. 63/582,078, filed on Sep. 12, 2023, which is incorporated by reference herein in its entirety for all purposes.

BACKGROUND

Field

The invention relates to steelmaking and more particularly to a process for producing clean steel with low nitrogen content and a high surface quality, suitable to be used in the automotive industry as base material for exposed and/or non-exposed auto parts, from hot rolling and cold rolling lamination processes, as well as galvanized and alloy coated steel products. More particularly, the invention relates to a process for producing clean steel with low nitrogen content in a steelmaking plant which comprises a direct reduced iron (DRI) source, an electric arc furnace (EAF), a steel vacuum degassing system (DS) and a continuous caster (CC) improving the overall productivity and products quality of the steelmaking plant.

Description of the Related Art

Demand of clean steel products has increased in the recent years for applications in the field of automotive parts, mainly looking for stringent quality and properties of exposed surfaces, while providing good formability, toughness, weldability and corrosion resistance to manufacture lightweight automotive components having high strength.

Also, in the aerospace field clean steels without defects or inclusions are required for manufacture of aviation components such as turbine blades, landing gear and structural parts. Other important field of clean steels is the electrical motors components where the energy efficiency requirements is increasing and steels having less electrical losses are demanded.

In this regard, the tendency in the industry is to reduce the content of carbon, nitrogen, oxygen and sulfur, since the presence of these elements adversely affects the mechanical properties of steel.

Production of steel oriented to markets of high quality such as the automotive industry requires meeting stringent characteristics and specifications of strength, conformability and high surface quality. It is known that one of the elements present in the steel which negatively affects the desired properties and quality of the steel product is nitrogen, therefore the need exists for an efficient method of producing a clean steel which ensures the low level of nitrogen content, along with low levels of carbon and sulfur content, by controlling the content of nitrogen all along the several process stages of the production route so that the final steel products meet the required specifications.

Clean steels with low nitrogen content are typically produced through the route Blast Furnace (BF)-Basic Oxygen Furnace (BOF)-Vacuum Degassing (DS) where the high carbon content of pig iron, of about 4% by weight, generates CO gas during the decarburization process with the oxygen blow promoting the nitrogen removal from liquid steel. In this regard, it is known that steel produced in an basic oxygen furnace (BOF) contains from 30 to 40 ppm of nitrogen and the steel produced in an electric arc furnace (EAF) under the current practices typically contains from 70 to 100 ppm of nitrogen.

This basic furnace (BF)-basic oxygen furnace (BOF) route however has a negative environmental impact because of the high $CO_2$ footprint as compared with the route of steelmaking using a direct reduced iron module and electric arc furnace (EAF) to melt steel scrap, direct reduced iron (in the form of pellets or briquettes) or both scrap and direct reduced iron (DRI) in various proportions, refining the steel tapped from the electric arc furnace (EAF) in a ladle furnace (LF) and then processing the molten steel in a degassing system (DS).

Although there are some publications related to the production of steel with low nitrogen content in an electric arc furnace (EAF), the current processes are not so effective and economically sound as compared with the process of the present application, wherein the steel has a low nitrogen content, in the order of 30 ppm, with a high productivity of the overall steelmaking facilities by reducing the processing time of the steel along a route comprising a direct reduced iron (DRI) module, an electric arc furnace (EAF), a vacuum degassing system (DS) and a Continuous casting installation (CC).

Several kinds of degassing installations are currently in use to achieve low levels of nitrogen content, for example the Ruhrstale-Heraeus furnace (RH) and the vacuum degasser (DS) and variants thereof. The final nitrogen content achievable under the reduced pressure however is affected by other factors and process conditions of the steelmaking route since the steel may pick up nitrogen from several sources at each process stage as well as during the transfer operations of steel between each stage and the next one.

There is a need of an efficient and effective integral method to produce steel products, with low nitrogen content, encompassing all the process stages from the metallic iron charge fed from a direct reduced iron (DRI) module to an electric arc furnace (EAF) up to feeding liquid steel to a continuous casting (CC).

Patent CN 112981038 describes a method for obtaining steel with low nitrogen content in a plant comprising an EAF, LF refining, vacuum degasser (VD) treatment and continuous casting (CC). The metallic iron charge is steel scrap and 30-40 w % molten iron. The method comprises adding a first part of lime at the 8th-12th minute (10-15 kg/t) and a second part of lime at the 20th-30th minute (15-20 kg/t.), and carbon powder (20-30 kg/t.) is injected using oxygen as carrier gas to form a foaming slag. The composition of the foaming slag is not disclosed. A synthetic slag is added into a ladle furnace (LF) and tapping the molten steel, adding ferrosilicon deoxidizer and adding more carbon powder to obtain refined molten steel, and the time of the bottom blowing argon (80-120 NL/min), is not less than 8 min.

This method is addressed to production of low nitrogen steel from steel scrap having very low carbon content without gangue and molten iron—These materials are different from direct reduced iron (DRI) which has a high carbon content and oxides that form an effective foamy slag.

US 2023093078 describes a process of producing steel may include the steps: EAF (or BOF)→LMF→RH→CC to produce steel with ultra-low carbon (as low as less than 30 ppm), and ultra-low sulfur (for example as low as less than 30 ppm), consistently and rapidly through an Ruhrstale-Heraeus (RH) degasser, even from liquid steel tapped out of the primary steelmaking furnace with high levels of sulfur and nitrogen such as those from an electric arc furnace (EAF). This patent application comprises adding fluxes and arcing the liquid steel to prevent sulfur reversion; and transferring the liquid steel from the ladle metallurgy furnace to a Ruhrstale-Heraeus (RH) degasser for carbon removal. There is no teaching or suggestion in this patent about utilizing different slag compositions to desulfurize and avoid nitrogen pickup.

Instead of focusing on applying a method or process for removing nitrogen from molten steel separately in each process stage, the route and process of the present application is more efficient and effective to obtain the desired specifications of steel products by reducing and controlling the nitrogen input of the raw materials, by improving the process parameters, and by limiting nitrogen pickup all along the steelmaking process up to the continuous casting system.

OBJECTIVES

It is therefore an objective to provide a process for producing steel with a low nitrogen content in a facility comprising a direct reduced iron (DRI) source, electric arc furnace (EAF), optional ladle furnace (LF) treatment, a degassing system (DS) and a continuous casting (CC) system.

It is another objective to provide a process for producing steel with a low nitrogen content and a low sulfur content.

It is another objective to provide a process for producing steel with a low nitrogen content where the nitrogen removal from steel and nitrogen pickup by steel is controlled through the steelmaking process stages from the direct reduced iron (DRI) source up to the continuous casting (CC) system.

Other objectives will be pointed out or will be evident from the description of the invention.

SUMMARY

The objectives are generally achieved by providing a process for producing clean steel products with low nitrogen content below 35 ppm, preferably below 30 ppm, in a steelmaking plant comprising a direct reduced iron (DRI) source, an electric arc furnace (EAF), a vacuum degassing system (DS), and a continuous casting system (CC). The metallic iron charge fed to the EAF comprises more than 70% by weight of direct reduced iron (DRI) (in the form of pellets or briquettes). Said process comprises a first stage of melting and refining the metallic iron charge in said electric arc furnace (EAF), a second stage comprising tapping the molten steel from the EAF to a ladle, third stage of exposing the molten steel to a pressure below atmospheric pressure in said vacuum degassing system (DS) and a fourth stage of casting molten steel to a final steel product in said continuous casting (CC). Optionally, the molten steel tapped from the electric arc furnace (EAF) is treated in a ladle furnace (LF) prior to being treated in the vacuum degassing system (DS).

The low nitrogen level in the final steel product is achieved by one or more of the following actions: (a) controlling the concentration of nitrogen and sulfur in the raw materials at each process stage, (b) promoting nitrogen removal from steel, (c) decreasing the time spent by the molten steel at each process stage and between each and subsequent process stages, and (d) preventing nitrogen pickup by the molten steel all along said process stages. Nitrogen removal is promoted and nitrogen pick-up is prevented by feeding to the EAF a metallic iron charge having a maximum of 60 ppm of sulfur and 30 ppm of nitrogen, which charge comprises steel scrap and/or one or more of direct reduced iron (DRI) (in form of pellets or briquettes), hot briquetted iron (HBI), pig iron, or other metallic iron-bearing materials, having a carbon content above 2.5% by weight, and by forming a first slag in said first process stage and maintaining said first slag in a foamy state by controlling the feed of fluxes, oxygen, and carbon to said EAF, and forming a second slag, between said first process stage and said second process stage, in contact with molten steel during tapping of steel from said EAF, having a predetermined composition capable of continuing the desulfurization and providing thermal insulation and chemical insulation of the molten steel after its tapping from the EAF.

The direct reduced iron (DRI) source may be a direct reduction plant or a DRI storage silo or bin. The DRI fed to the EAF preferably has a maximum of 60 ppm of sulfur and 25 ppm of nitrogen. The DRI may be in the form of pellets or briquettes with high metallization≥90% and high carbon content≥2.5% by weight, which carbon content contributes to remove nitrogen.

The feed of fluxes, oxygen and carbon to said electric arc furnace (EAF) are controlled to form a first foamy slag in said EAF so that the amount of each of the following oxides are comprised within the following ranges where the sum thereof represents 100% by weight: FeO from 24% to 40%, MgO from 7% to 15%, $Al_2O_3$: from 4% to 11%, CaO: from 16% to 40%, $SiO_2$: from 8% to 24%.

After tapping molten steel from the EAF into a ladle, a second slag, capable of continuing the desulfurization and thermal insulation and chemical insulation of the molten steel, is formed with a composition comprising MgO from 5 weight % to 9 weight %, and also comprising CaO, $Al_2O_3$ and $SiO_2$ in the proportions: $Al_2O_3$ from 30 weight % to 35 weight %, CaO from 50 weight % to 58 weight %, and $SiO_2$ from 3% to 8 weight %.

Steel products made according to the application comprise the following elements expressed in weight %: C≤0.05%, Si≤4.5%, Al≤2.0%; Mn≤2.0%; P≤0.20%; Ni≤0.200%, Cu≤0.200%; Ni≤0.200%, N≤0.0030%, S≤0.0035%.

Steel products made according to the application, may optionally also comprise one or more of the following elements expressed in weight %: Sb≤0.20%; Sn: ≤0.05%; Cr: ≤0.20%; Mo: ≤0.20%; Ti: ≤0.10%, Bi: ≤0.010%; Pb: ≤0.010%; V: ≤0.100%, B: ≤0.0050%, Rare Earths Elements: ≤0.020%.

DETAILED DESCRIPTION

Figure 1:
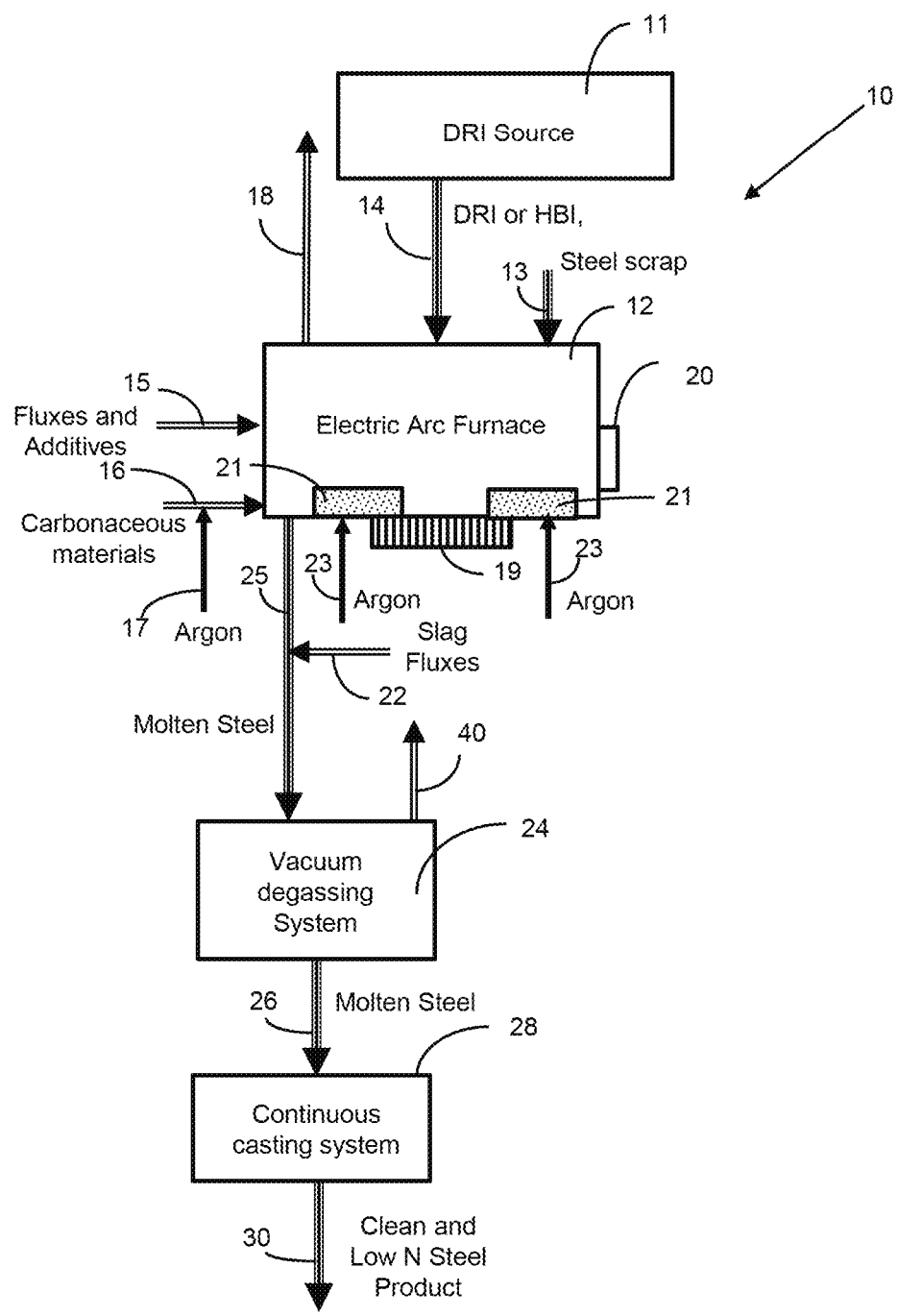
FIG. 1 shows a schematic diagram of the steelmaking route and its main process stages of an embodiment not including a ladle furnace (LF) treatment stage.

This description is intended to be exemplary only and there is no intention of limiting the applications or uses of the present inventions which is defined in the claims. To facilitate the reading of the description of the embodiments shown here, the same reference numerals are used to designate the same or equivalent elements throughout all the Figures.

Referring to FIG. 1, numeral 10 generally designates a process route for producing steel with low nitrogen content according to an embodiment. Route 10 comprises a direct reduced iron source (DRI) 11, an electric arc furnace (EAF) 12, a vacuum degassing system (DS) 24 and a continuous casting system (CC) 28.

A charge of metallic iron materials such as DRI and/or HBI 14 and steel scrap 13 are fed to the EAF 12 to form a molten steel bath to be processed adjusting the concentration of C, N, S, P, Mn, among other elements to meet the specifications of the desired steel product. Electrical energy is applied to one or more electrodes that heat and melt the iron charge from an electric arc between the electrodes and said metallic charge. Fluxes (for example, dolomite and lime) additives 15 and carbonaceous materials 16 are fed to the EAF to form a layer of a first foamy slag.

The metallic iron charge may be one or more of the following iron-bearing materials: steel scrap 13, direct reduced iron (DRI) (pellet or briquet) and/or hot briquetted iron (HBI) 14, solid or liquid pig iron, or hot metal. According to some embodiments, these materials have a carbon content above 2.5% by weight, preferably above 3% by weight or between 3% and 4% by weight and in some embodiments between 4% and 6% by weight because said carbon reacts with oxygen in the molten steel forming CO which evolves in small bubbles through the molten steel and then the nitrogen is withdrawn from the electric arc furnace (EAF). It is theorized that nitrogen is transferred from the liquid steel into the CO bubbles and is then withdrawn from the EAF along with other gases 18 that evolve during the melting, and refining stage of the EAF operation. The amount of CO bubbles generated from carbon in the metallic charge and therefore the amount of nitrogen removed, is directly proportional to the amount of carbon in the charge. Preferably, most of the carbon in the DRI is in the form of iron carbide $Fe_3C$.

Additional carbonaceous materials 16 with low nitrogen content may be injected into the molten steel through suitable lances and carrier gases. The carbonaceous materials may be coke, coal, graphite or similar carbon carriers. According to some embodiments, the carbonaceous materials may also be derived from biomass or any biofuel. Carbonaceous materials 16 are injected into the electric arc furnace (EAF) 12 using argon 17 as transport gas.

The electric arc furnace (EAF) is a vessel that is not easy to be isolated from the environmental air and therefore, the molten steel therein may be exposed to air, and it may pick up nitrogen, especially in the zone of the electric arc due to the ionizing effect of the electric arc on the air. To decrease the entrance of air into the EAF that might contact and transfer nitrogen to the steel, the steel scrap 13, DRI (pellet or briquet), HBI or any other solid iron-containing charge 14 are fed to the EAF as continuously as possible so as to form and maintain a stable foamy slag layer, the slag door 20 of the EAF 12 is maintained closed to minimize air entrance, and argon 17 is used as transport gas to feed the carbonaceous materials 16 and also to maintain an inert and positive pressure atmosphere inside the EAF 12.

In some embodiments, an electromagnetic stirring system 19 and/or other stirring systems are installed in the EAF 12. This stirring of the liquid steel contributes to nitrogen removal because the extra stirring increases the residence time of the bubbles of CO, resulting in a larger travel trajectory of said bubbles and therefore, they have more time to catch and remove nitrogen. Next, in the interface between steel and slag layer, the bubbles of CO in the slag provide an increased area transfer; so, nitrogen elimination is favored (mass transfer controlling step); and as a result, the nitrogen gets into the bubbles and then is released to the air.

Stirring during tapping by means of argon injection 23 and additions of fluxes to produce CO (for example, $CaCO_3$), contributes to remove nitrogen. During this stage it is important to maintain argon flowing through porous plugs 21 which, added to the oxygen concentration and the generation of gases from various fluxes and slag formers 22, favor the removal of nitrogen and avoid its pickup by steel.

This effect may be explained by some reactions producing CO and $CO_2$, for example $CaCO_3$, that produce $CO_2$ which in turn decreases the partial pressure of nitrogen in the gas phase, which inhibits the nitrogen transfer back to the molten steel.

$$CaCO3 = CaO + CO_2$$

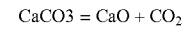

$$P_T = \sum_i^n p_i = p_{[Ar]} + p_{[CO]} + p_{[O]} + p_{[N]}$$

Where
$P_T$=total pressure of the system 1 atm
$p_{[Ar]}$=partial pressure of Argon
$p_{[CO]}$=partial pressure of CO
$p_{[O]}$=partial pressure of oxygen
$p_{[N]}$=partial pressure of nitrogen
When the partial pressure of other gases in the steel increases, the nitrogen partial pressure decreases.

After the full charge is melted and the temperature of the steel is adequate for continuing its processing (above 1600° C.), the molten steel 25 is tapped from the electric arc furnace (EAF) to a ladle. The ladle is then transferred to a vacuum degassing system (DS) 24.

The degassing system may be a conventional vacuum degasser (DS) or a Ruhrstale-Heraeus furnace (RH) or similar vacuum system where the pressure is reduced below atmospheric pressure to promote extraction of some elements in steel as carbon, hydrogen and nitrogen, which is extracted therefrom along with other gases 40.

After treatment in the vacuum degassing system (DS) 24, the molten steel 26 is transferred to a continuous casting installation (CC) 28 to be cast as sheet or in the form of other shaped product 30. To avoid nitrogen pickup at this fourth process stage, the molten steel contained in the ladle, tundish and mold is protected from contact with nitrogen of air by a cover of argon atmosphere and with casting powder, as well as with the use of other devices.

In some embodiments, as described with reference to FIG. 1, there is no need of processing the steel in a ladle furnace (LF), thus shortening the processing time and also decreasing the capital and operation costs of the steelmaking facilities. The shortened process route, without an LF treatment stage, also provides the benefit of decreasing the possible contact of steel with atmospheric air, thus maintaining the low content of nitrogen up to the final process stage.

Figure 2:
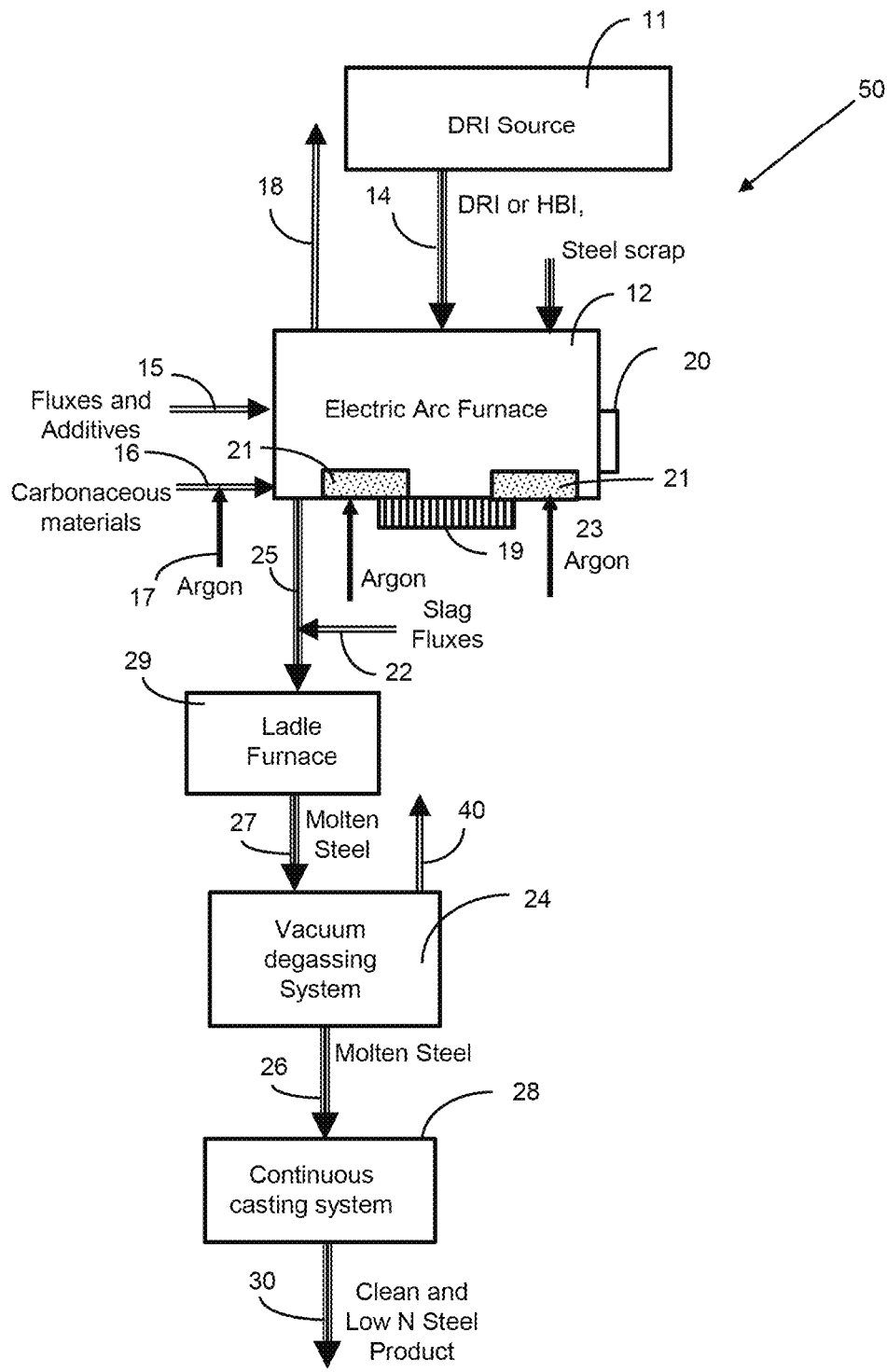
FIG. 2 shows a schematic diagram of the steelmaking route and its main process stages of an embodiment including a ladle furnace (LF) treatment stage.

Referring to FIG. 2, the process route 50, for producing steel with low nitrogen content according to another embodiment, comprises a direct reduced iron (DRI) source 11, an electric arc furnace (EAF) 12, a vacuum degassing system (DS) 24, a continuous casting system (CC) 28, and a ladle furnace (LF) 19 adding a fifth process stage carried out between the first process stage in the said EAF 12 and the second process stage in said vacuum degassing system 24. The LF treatment may be useful in some embodiments to carry out refining operations such as deoxidation, desulfurization, addition of alloying elements or inclusion modification.

In this embodiment, the molten steel 25 tapped from the electric arc furnace (EAF) 12 is transferred to a ladle furnace (LF) process stage 29 to be further refined in a ladle metallurgy stage. Thereafter, the molten steel 27 is treated in a vacuum degassing system (DS) 24 and thereafter transferred to a continuous casting system (CC) 28 in a similar manner as described with reference to the process route of FIG. 1.

Figure 3:
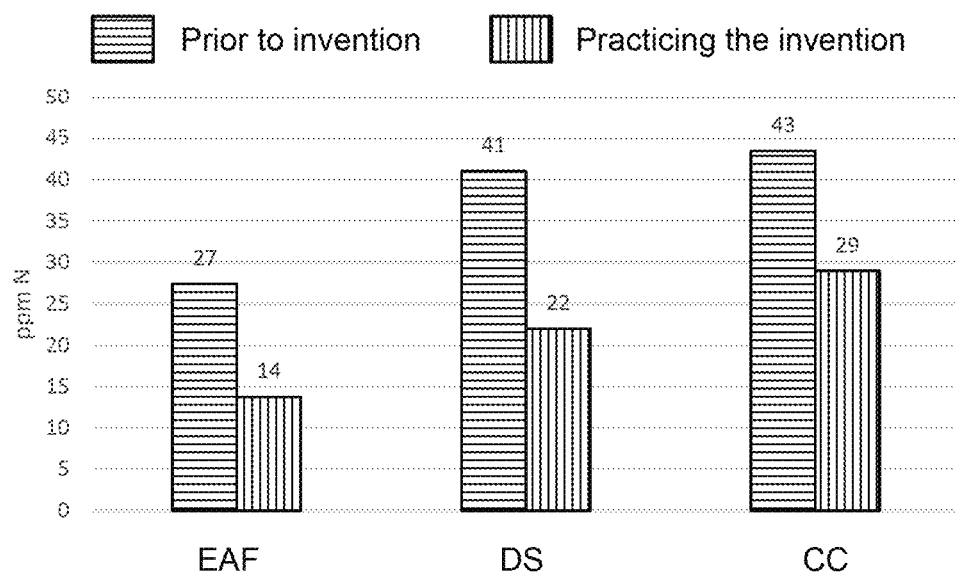
FIG. 3 shows a graph comparing the nitrogen content of molten steel after each stage of the process, according to an embodiment not including a ladle furnace (LF), without applying the process of the application and applying the process of the application.

FIG. 3 shows the results obtained in tests of the steelmaking process indicating the average nitrogen content of the steel after the first process stage at the EAF, the third process stage at the DS and the fourth process stage at the CC, according to an embodiment following process route 10 without an LF treatment stage. The content of nitrogen in the steel after each process stage is lower when practicing embodiments of the present application than the content of nitrogen not using the present embodiments and meets the desired nitrogen content in the final steel product after CC.

Figure 4:
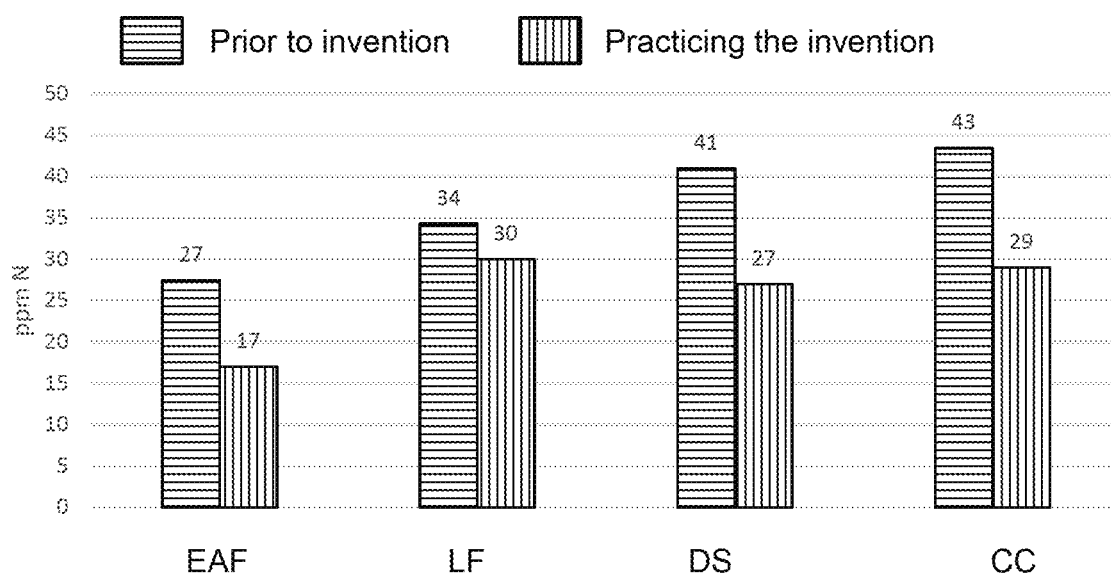
FIG. 4 shows a graph comparing the nitrogen content of molten steel after each stage of the process, according to an embodiment including a ladle furnace (LF), without applying the process of the application and applying the process of the application.

FIG. 4 shows the results obtained in tests of the steelmaking process indicating the average nitrogen content of the steel after the first process stage at the EAF, the fifth process stage LF treatment, the third process stage DS at the degassing system and the fourth process stage at the CC, according to an embodiment following process route 50 comprising an LF treatment stage. The content of nitrogen in the steel after each process stage is lower when practicing embodiments of the present application than the content of nitrogen not using the present embodiments and meets the desired nitrogen content in the final steel product after CC.

In another aspect, the low nitrogen content of the steel is achieved following three general strategies for nitrogen removal or nitrogen pickup prevention:
(a) controlling the concentration of nitrogen and sulfur in the raw materials at each process stage,
(b) promoting nitrogen removal from steel,
(c) decreasing the time spent by the molten steel at each process stage and between each and subsequent process stages, and
(d) preventing nitrogen pickup by the molten steel all along said process stages.

The strategy (a) includes the following actions:
Feeding to the electric arc furnace (EAF) one or more of premium steel scrap, direct reduced iron (DRI) (pellet or briquet), hot briquetted iron (HBI), briquet iron, pig iron or hot metal constituting at least 70% by weight of the metallic iron charge, having a carbon content above 2.5% by weight.
Feeding the direct reduced iron (DRI) (pellet or briquet) or hot briquetted iron (HBI) continuously to the electric arc furnace (EAF) and maintaining the slag door closed.
Argon is used as transport gas to feed the carbonaceous material and to keep an inert atmosphere inside the electric arc furnace (EAF).
Limiting the sulfur input to the electric arc furnace (EAF) by controlling the sulfur content of carbon materials, direct reduced iron (DRI) (pellet or briquet), hot briquetted iron (HBI), pig iron, hot metal, alloys, fluxes, which are sources of sulfur.—Using argon as carbon transport gas instead of compressed air.

The strategies (b) and (c) include the following actions:
Preferably, feeding the direct reduced iron (DRI) (pellet or briquet) at a high temperature of 400° C. or higher.
Forming a foamy slag layer in the electric arc furnace (EAF) for protection of the electric arc radiation and for improving the electrical energy transfer to the metallic charge, whereby the power-on time can be reduced and consequently the exposure of the metallic bath to air and therefore the nitrogen pickup is also reduced.
Stirring system in the electric arc furnace (EAF) (electromagnetic stirring systems, argon injection through porous plugs systems, etc).
Formulation and forming a second slag during tapping the steel from the electric arc furnace (EAF).
Use only hot (more than 3 heats) and cleaned ladles (not skulls or slag are allowed)
Coordinating the ladle moving operations of the steelmaking facilities so that the time that steel spends between each process stage is minimized.
Shortening the decarburization time at the degassing system in order to extend the time of nitrogen removal after deoxidation.

The strategy (d) includes the following actions:
Design and formulation of slag during tapping for the following purposes:
carry over furnace slag should be maximum 4 kg/t
formula of liquid slag capable to avoid reoxidation and nitrogen pickup.
providing a thermal isolation for steel during the transfer through all process stages.
able to keep the sulfur in the slag and to continue desulfurization in the subsequent process stages and helps to remove nitrogen.
All lift gas nozzles in degasser must be available during the tests to allow required lift gas flow Vessel and snorkel in degasser must be well pre-heated and maximum 1 hour after the last treatment in degasser, at least 3 heats must be treated prior the tests with the same kind of grades which will be subjected to the test In degasser, vessel and snorkel must be clean and free of skull Purging system of tundish before and during casting Draining any hot heel remaining at the electric arc furnace (EAF) and changing the steel tap hole.

The above strategies define a steelmaking practice that the applicant has tested at industrial scale, provides an effective and efficient production process of clean steel with low nitrogen content. Embodiments of the present Application provide a process where the average nitrogen content in the steel is maintained at 35 ppm or less.

The heat produced by the electric arc is transferred to the metallic charge being melted and to the molten steel, but it may also overheat the refractory lining or in the wall and roof of the EAF causing damages that require repair or re-lining of the furnace or replacement of water-cooled panels. The foamy slag is formed by CO produced by the reaction of carbon in the metallic charge and oxygen from oxides in said charge and oxygen injected for decarburization protects the walls and roof of the EAF.

The composition of this first foamy slag comprises FeO, CaO, MgO, $Al_2O_3$, $SiO_2$ among its main elements. The foamy characteristics and the basicity of the first slag produced in the EAF 12 are formulated so that the foamy state of said slag is maintained in the EAF 12. In some embodiments, the composition of the first slag is formulated on the basis of diagrams of thermal iso-activity of elements to promote nitrogen removal and prevent nitrogen pickup during this process stage.

Figure 5:
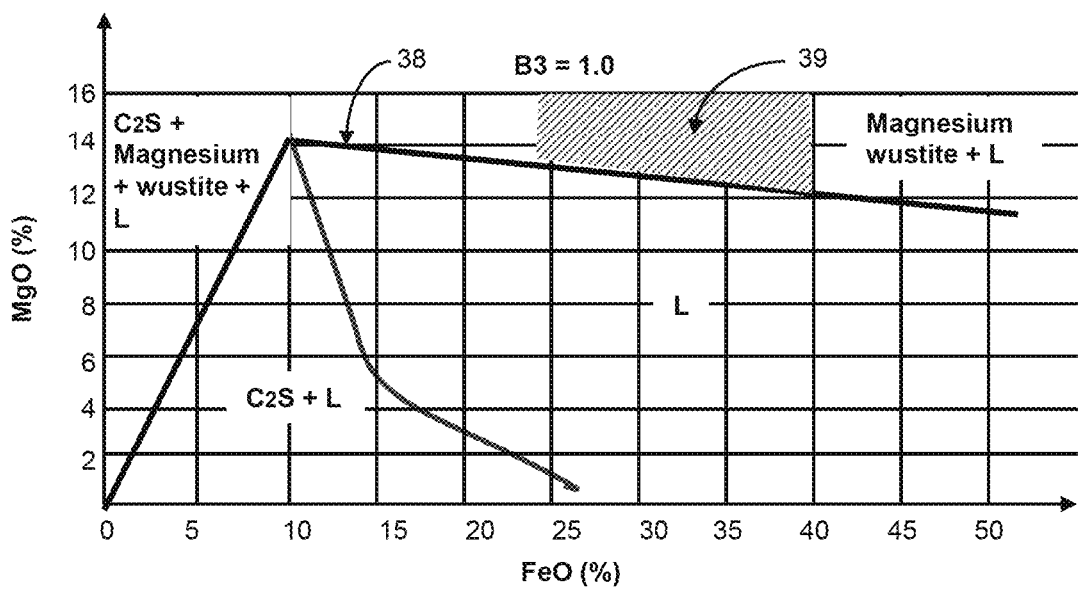
FIG. 5 shows a graph showing the preferred relationship between the content of MgO and the content of FeO in the slag formed in the electric arc furnace (EAF) to assure that the first slag is maintained foamy enough to remove nitrogen from steel.

With reference to FIG. 5, the first foamy slag formed at the electric arc furnace (EAF) 12 has a composition where the ratio of MgO to FeO lies above the line 38 in the phase diagram and within the zone 39 in said phase diagram. This line 38 indicates that the slag has the foamy properties to achieve the intended purposes to provide: thermal isolation and a physical barrier protecting the steel from contact with atmospheric air as well as an improved arc cover reducing the power-on time and as a result also the steel processing time is reduced.

Figure 6:
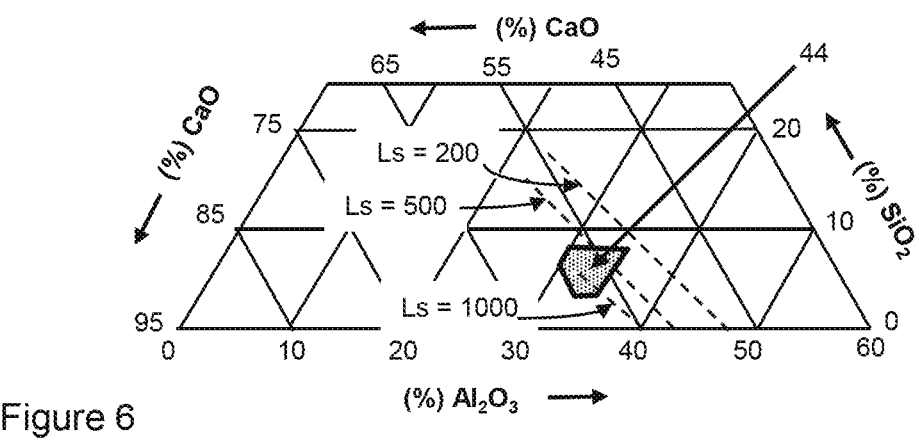
FIG. 6 shows a ternary diagram of the oxides CaO, Al2O3 and SiO2 showing the preferred relationship of these oxides in a second slag formed during tapping of molten steel from the EAF to assure that said second slag is capable of continuing desulfurization and thermal insulation and chemical insulation of molten steel.

Referring to FIG. 6, in some embodiments, the design and formulation of the second slag formed after tapping from the electric arc furnace (EAF) 12 provides to this second slag a high capacity of desulfurization that avoids the need of a ladle furnace (LF) treatment to remove sulfur and therefore advantageously the overall process time of the process route 10 of steel is shortened.

A second slag is formulated and formed after tapping the molten steel 25 from the electric arc furnace (EAF) 12 with a composition having a high capacity of desulfurization and providing thermal insulation and chemical insulation of the molten steel. The composition of the second slag, when the MgO content is between 5% and 8% by weight in said slag, comprises $Al_2O_3$, CaO and $SiO_2$ in the following proportions in weight % of the sum of these compounds:

$Al_2O_3$: 30%-35%

CaO: 50%-58%

$SiO_2$: 3%-8%

These proportions, represented by area 44 in FIG. 6, provide the capability of slag to remove sulfur from steel with values of Ls=1000, Ls=500 and Ls=200 where Ls=(S)/[S] and where (S) is the concentration of sulfur in slag, and [S] is the concentration of sulfur in steel.

The second slag according to some embodiments is designed to form and remain as a liquid layer over the steel in order to avoid nitrogen pickup and continuing desulfurization after tapping from the electric arc furnace (EAF) 12 as well as to provide improved process conditions to remove the nitrogen content of steel during vacuum degassing treatment (DS).

Figure 7:
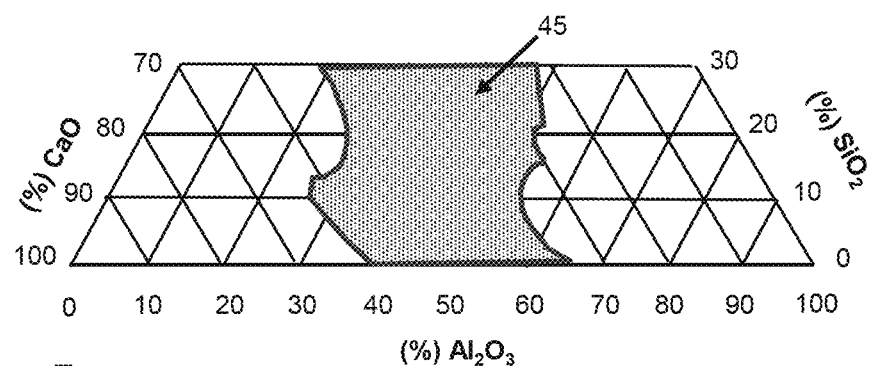
FIG. 7 shows a ternary diagram of the same oxides of FIG. 4 showing the preferred relationship of these oxides in the second slag so that it remains liquid to continue the desulfurization and thermal insulation and chemical insulation of molten steel.

Referring to FIG. 7, the composition of this second slag is therefore controlled so that on the basis of a constant content of MgO the amount of each of the relevant oxides are comprised within the following ranges where the sum thereof represents 100% by weight: MgO from 5% to 9%, $Al_2O_3$ from 30% to 35%, CaO from 50% to 58%, $SiO_2$ from 3% to 8%. These proportions are indicated by the area 45 in the diagram.

In some embodiments, the Basicity B3 of said first foamy slag, defined as B3=CaO/($Al_2O_3$+$SiO_2$), is within the range of 0.7 to 1.5.

In some embodiments, the hot metallic charge of direct reduced iron (DRI) (pellet or briquet) and/or hot briquetted iron (HBI) and/or is fed to the electric arc furnace (EAF) at a temperature above 400° C.

In some embodiments, the MgO is added in the EAF in the form of dolomite.

In some embodiments, argon is injected into the EAF as transport gas to feed carbonaceous materials and to keep an inert atmosphere inside the EAF.

In some embodiments, the degassing system (DS) is a vacuum treatment system.

In some embodiments, the degassing system (DS) is a Ruhrstale-Heraeus furnace (RH) system.

In some embodiments, the residence time of steel at the degassing stage is at least 18 minutes, where it is exposed to a deep vacuum level of less than 1 milibar under reducing conditions. These conditions favor sulfur and nitrogen removal.

In some embodiments, the composition of the steel after tapping from the EAF includes:

Carbon: <0.05%,

Oxygen: >400 ppm

Nitrogen: <20 ppm

Sulfur: <0.020%

In some embodiments, the composition of the steel product after continuous casting includes Nitrogen: <25 ppm and Sulfur: <0.015%.

In some embodiments, one or more of steel scrap, DRI (pellet or briquet), HBI, pig iron or hot metal are continuously fed to the EAF.

In some embodiments, the sulfur content of carbon materials, premium steel scrap, DRI (pellet or briquet), HBI, pig iron, hot metal, alloys, fluxes, which are sources of sulfur, is limited within predetermined amounts.

EXAMPLES

Several heats in a steel plant were carried out according to some embodiments of the Application and the results are here described.

The heats were carried out in a direct current electric arc furnace (EAF) with conventional electrodes. The metallic iron charge was 100% direct reduced iron (DRI) having 3 w % of carbon and a hot heel of 55 tons. Average power was 103 MW. The average duration of heats was 56 minutes, and the tap temperature was 1630° C. A summary of these heats is shown in TABLE 1:

TABLE 1

| HEAT | N at EAF tapping [ppm] | T [° C.] | Oxygen [ppm] | Dolo lime [kg/t] | Lime [kg/t] | Degassing time [min] |
|---|---|---|---|---|---|---|
| 1 | 17 | 1632 | 895 | 84.0 | 2.7 | 20 |
| 2 | 10 | 1650 | 1056 | 77.4 | 3.3 | 20 |
| 3 | 11 | 1628 | 992 | 71.6 | 2.3 | 20 |
| 4 | 11 | 1635 | 1066 | 74.8 | 2.2 | 20 |
| 5 | 15 | 1610 | 983 | 68.8 | 2.3 | 20 |
| 6 | 20 | 1626 | 887 | 73.1 | 2.5 | 20 |
| Average | 14 | 1630 | 979.8 | 74.9 | 2.5 | 20 |

After tapping from the electric arc furnace (EAF) the nitrogen content was 21 ppm, at the beginning of the degassing stage 28 ppm, at the end of degassing 22 ppm and at the end of continuous casting (CC) 33 ppm.

The composition of the slag at the end of stages 1 and 2 are shown in TABLE 2:

TABLE 2

| | Stage 1 - EAF | Stage 2 - Tapping EAF |
|---|---|---|
| CaO | 25.00 | 55.7 |
| $SiO_2$ | 15.97 | 4.9 |
| $Al_2O_3$ | 7.32 | 30.9 |
| MgO | 14.11 | 8.4 |
| FeO | 37.60 | |

Another aspect relates to the manufacture of clean steels where the necessary alloying elements to fulfill the specifications for particular applications formed as steel sheet.

The present Application provides a process to produce clean steel with reduced contents of carbon, nitrogen and sulfur by a combination of refining techniques through the use of specific slag compositions, vacuum degassing and inert gas purging, as well as preventing the steel from picking up nitrogen or other impurities during the various process stages from raw materials melting and refining up to continuous casting of said steel.

In some embodiments, clean steel products with low nitrogen content can be produced, comprising the following elements in weight %:

C≤0.05%;
Si≤4.5%
Al≤2.0%;
Mn≤2.0%;
P≤0.20%;
Ni≤0.200%
Cu≤0.200%;
N≤0.0030%
S≤0.0035%.

In some embodiments, a clean steel product with low-nitrogen content made can be produced, further comprising one or more of the following elements within the respective limits expressed in weight %:

Sb≤0.20%;
Sn: ≤0.05%;
Cr: ≤0.20%;
Mo: ≤0.20%;
Ti: ≤0.10%
Bi: ≤0.010%;
Pb: ≤0.010%;
V: ≤0.100%.
B: ≤0.0050%.
Rare Earths Elements: ≤0.020%.

The clean steel products made according to some embodiments comply with the requirements set by the markets related to the automotive industry, particularly for applications where a high-quality exposed surface is demanded.

It is of course to be understood that the embodiments described here are only included for a better understanding of the scope and spirit of the inventions and not to limit in anyway its scope, which is defined in the appended claims.

What is claimed is:

1. A process for producing clean steel in a steelmaking plant comprising a direct reduced iron (DRI) source, an electric arc furnace (EAF), a degassing system (DS), and a continuous casting (CC) system, wherein the process comprises:
   melting and refining a metallic iron charge in the EAF to form molten steel, wherein the metallic iron charge comprises at least 70% by weight of a direct reduced iron (DRI), a maximum sulfur content of 60 ppm, a maximum nitrogen content of 35 ppm, at least 2.5% by weight of carbon, and $Fe_3C$;
   tapping molten steel from the EAF into a ladle once a temperature of the molten steel in the EAF is above 1600° C.;
   exposing the molten steel to a pressure below atmospheric pressure in the DS; and
   casting the molten steel in the CC system, wherein melting and refining the metallic iron charge comprises:
   forming a first slag comprising CO gas bubbles, wherein the first slag has a first composition that is within a predetermined composition range that consists essentially of, in weight %, 24% to 40% FeO, 7% to 15% MgO, 4% to 11% $Al_2O_3$, 16% to 40% CaO, and 8% to 24% $SiO_2$;
   maintaining the first composition within the predetermined composition range while the molten steel is within the EAF; and
   stirring the molten steel; and
   wherein tapping the molten steel from the EAF into the ladle comprises forming a second slag over the molten steel, wherein the second slag has a second composition that consists essentially of, in wt. %, 5% to 9% MgO, 30% to 35% $Al_2O_3$, 50% to 58% CaO, and 3% to 8% $SiO_2$, and wherein the second slag is configured to absorb sulfur from the molten steel.

2. The process of claim 1, wherein the steelmaking plant further comprises a ladle furnace (LF) that comprises the ladle and wherein tapping the molten steel from the EAF into the ladle comprises tapping the molten steel from the EAF into the LF.

3. The process of claim 1, wherein a Basicity B3 of the first slag, defined as $B3=CaO/(Al_2O_3+SiO_2)$, is 0.7 to 1.5.

4. The process of claim 1, wherein the DRI source is a direct reduction plant and wherein the DRI is in the form of pellets or briquettes and has a carbon content greater than 2.5% by weight.

5. The process of claim 1, wherein the DRI is in the form of pellets or briquettes and has a carbon content between 3% and 4% by weight.

6. The process of claim 1, wherein the DRI is in the form of pellets or briquettes and has a carbon content between 4% and 6% by weight.

7. The process of claim 1, wherein the DRI is in the form of pellets or briquettes and is charged to the EAF at a temperature above 400° C.

8. The process of claim 1, wherein the DRI source is a silo or bin.

9. The process of claim 1, wherein forming the first slag comprises adding dolomite to the EAF.

10. The process of claim 1, wherein maintaining the first composition within the predetermined composition range comprises injecting argon into the EAF.

11. The process of claim 1, wherein the DS is a vacuum treatment system.

12. The process of claim 1, wherein the DS is a Ruhrstale-Heraeus furnace (RH) system.

13. The process of claim 1, wherein the EAF comprises a stirring system and wherein stirring the molten steel comprises stirring the molten steel with the stirring system.

14. The process of claim 13, wherein said stirring system is electromagnetic.

15. The process of claim 13, wherein stirring stirring the molten steel comprises injecting a gas into the EAF.

16. The process of claim 15, wherein said gas is argon.

17. The process of claim 1, wherein, after tapping the molten steel from the EAF, the molten steel comprises:
Carbon: <0.05 weight %;
Oxygen: >0.04 weight %;
Nitrogen: <0.002 weight %;
Sulfur: <0.020 weight %.

18. The process of claim 1, wherein, after casting the molten steel, the molten steel comprises Nitrogen: <0.0035 weight % and Sulfur: <0.015 weight %.

19. The process of claim 1, further comprising continuously feeding one or more of steel scrap, DRI (pellets or briquettes), hot briquetted iron, pig iron, and hot metal to the EAF.

20. The process of claim 1, wherein exposing the molten steel to the pressure below atmospheric pressure in the DS comprises exposing the molten steel to the pressure below atmospheric pressure in the DS for at least 15 minutes.

21. The process of claim 1, wherein the pressure below atmospheric pressure is less than 1 milibar.

22. A clean steel product with low nitrogen content made according to the process of claim 1, comprising the following elements in weight %:
$C \leq 0.05\%$;
$Si \leq 4.5\%$;
$Al \leq 2.0\%$;
$Mn \leq 2.0\%$;
$P \leq 0.20\%$;
$Ni \leq 0.200\%$;
$Cu \leq 0.200\%$;
$N \leq 0.0030\%$;
$S \leq 0.0035\%$.

23. A clean steel product with low-nitrogen content made according to the process of claim 1, further comprising one or more of the following elements within the respective limits expressed in weight %:
$Sb \leq 0.20\%$;
Sn: $\leq 0.05\%$;
Cr: $\leq 0.20\%$;
Mo: $\leq 0.20\%$;
Ti: $\leq 0.10\%$;
Bi: $\leq 0.010\%$;
Pb: $\leq 0.010\%$;
V: $\leq 0.100\%$;
B: $\leq 0.0050\%$;
Rare Earths Elements: $\leq 0.020\%$.

* * * * *